H. A. PRESSMAN.
POWER DRIVEN AUTOMOBILE SLEIGH.
APPLICATION FILED OCT. 23, 1915.
1,197,764.
Patented Sept. 12, 1916.
2 SHEETS—SHEET 1.
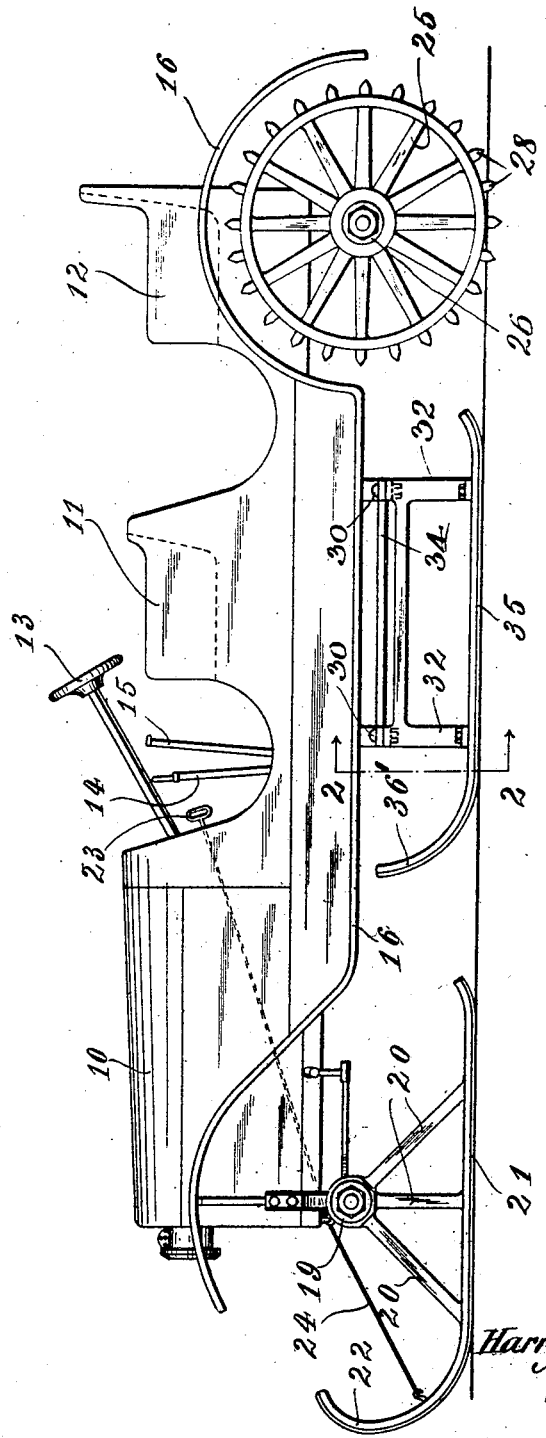
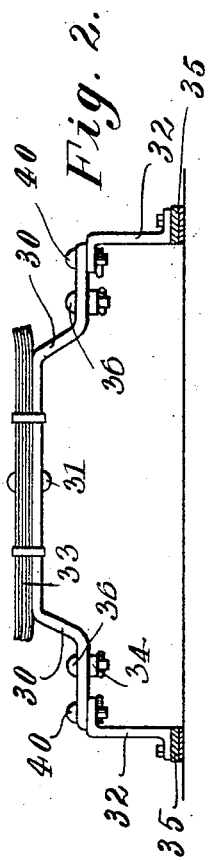
INVENTOR
Harry A Pressman
BY Oscar Geier.
HIS ATTORNEY

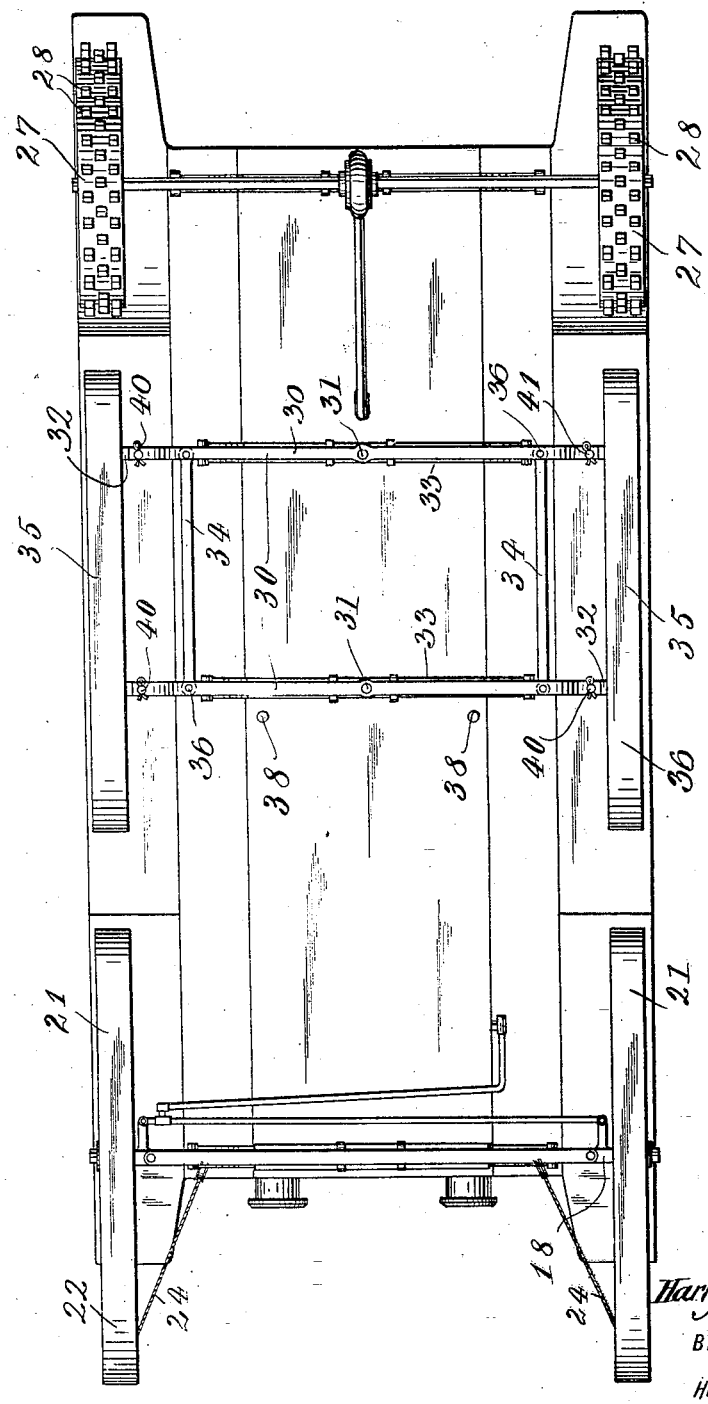

United States Patent Office.

HARRY A. PRESSMAN, OF NEW YORK, N. Y., ASSIGNOR OF ONE-HALF TO MAX PRESSMAN, OF NEW YORK, N. Y.

POWER-DRIVEN AUTOMOBILE-SLEIGH.

1,197,764.

Specification of Letters Patent. Patented Sept. 12, 1916.

Application filed October 23, 1915. Serial No. 57,392.

*To all whom it may concern:*

Be it known that I, HARRY A. PRESSMAN, subject of the Czar of Russia, and resident of New York, in the county of New York and State of New York, have invented certain new and useful Improvements in Power-Driven Automobile-Sleighs, of which the following is a specification.

This invention relates to improvements in self-propelling, dirigible vehicles, of the automobile type, and has for its object the provision of means whereby the vehicle may be transformed from a wheel supported style to another sustained by runners in the manner of a sleigh.

Another object is to so arrange the runners that they may be speedily mounted in place of the usual wheels, involving no change in the driving gear, motor, steering means or superstructure, merely being a replacement of certain parts and the addition of others.

These and other objects are attained by the novel construction and combination of parts, hereafter described and shown in the accompanying drawings, forming part of this specification, and in which:—

Figure 1 is a side elevation of a conventional form of automobile as transformed into an autosleigh. Fig. 2 is a partial sectional view, taken on line 2—2 of Fig. 1. Fig. 3 is a detail perspective view of one of the spurs, and Fig. 4 is a plan view of the vehicle, looking from the bottom.

Referring more particularly to Fig. 1, of the drawings, 10 indicates the hood over the motor, 11 and 12 the front and rear seats respectively, 13 the steering wheel, 14 and 15 the brake and control levers and 16 the running board, dust guard or step, the bottom of which is presumed to be coincident with the floor of the vehicle.

At the front the wheels, ordinarily mounted on the knuckles 18, are replaced by the hubs 19, similar to those of the wheels and attached by the same means; from the hubs extend spokes or supports 20, engaging at their outer ends with the runners 21, which are curved at their fronts, as at 22, and also slightly turned up at the rear. As will be seen, these front runners support the front of the vehicle and are steered in exactly the same manner by the same means and mechanism as the wheels for which they are substituted.

A handle 23 is provided conveniently for grasping by the operator seated in the vehicle and extending from the handle is a cable 24 the branches of which are attached to the front part of the front runners, the cable running over pulleys, as shown and affording means whereby the runners may be raised slightly at intervals, as in entering into snow drifts and the like.

At the back of the structure the rear wheels are exchanged for other driving wheels 25, held by their hubs and having relatively wide rims 27 in which are set a plurality of spurs 28, disposed in circumferential rows, the spurs in each alternate row being offset so as to provide a large number of wedge shaped spurs adapted to engage with snow or ice and propel the vehicle as do the ordinary driving wheels on the surface of a road. The same braking device is intended to be used, or duplicates of them, so that the vehicle is fully under control and obviously will move forward or backward with the proper and usual application of power to the shaft. While a portion of the weight is necessarily placed on these rear wheels in order to cause the spurs to properly engage with the surface traveled over, another portion of the weight is taken on the bars 30, secured by the pivots 31 at the center of the underside of the transverse support springs 33, the bars being connected by the links 34, through the pivots 36, and continuing outward to the pivotal joints 40, by which the supports 32 are engaged, the latter being rigidly connected at their lower ends to the runners 35, so that the same always remains substantially parallel with the center line of the vehicle irrespective of any angularity which the bars 30 may assume. Stop or limit pins 38 are fixed rigidly in the under side of the frame against which one of the bars 30 may make contact as they turn upon the pivots 31, preventing excessive angular movement of the same. Thus it will be seen that the runners 35 will track in the path of the front runners, and also with the driving wheel rims 27, although either one of the rear runners may move temporarily slightly in advance of the other, a condition very desirable in turning corners or meeting obstructions, causing the vehicle to run more smoothly than if the runners were rigidly attached to the frame. Like the other runners, the rear set are turned up at the front, as at 36' and also slightly at the back, to avoid catching into the surface traveled over. Thus it will be seen that any wheeled vehicle may be readily metamorphosed into one of the runner type at small expense.

Having thus described my invention and pointed out its construction and manner of use, what I claim and desire to secure by Letters Patent, is:—

1. In an auto-sleigh, the combination with a body having a propelling mechanism and a dirigible front axle, of a pair of front runners engaged with said dirigible axle, a pair of spurred driving wheels operatively engaged with said propelling mechanism, a pair of bars pivoted to said body, their ends extending laterally outward, rods connecting said bars in parallel, and a second pair of runners pivotally engaged on the ends of said bars.

2. In a power driven auto-sleigh, a pair of front runners, a pair of rear runners, said rear runners being so mounted as to permit one runner to move in advance of the other, means for limiting such advance movement, a pair of spurred driving wheels and means whereby said wheels are positively driven.

3. In a power driven autosleigh, a pair of dirigible front runners, a pair of driving wheels, a pair of runners intermediate of said front runners and wheels, and pivoted mountings for said intermediate runners whereby they are held parallel to the sleigh but capable of a limited free movement in the direction of their length.

Signed at New York in the county of New York and State of New York this 14th day of October A. D. 1915.

HARRY A. PRESSMAN.

Witnesses:
  O. D. GEIER,
  ADELAIDE F. BEISNER.